United States Patent
Yoshizawa et al.

(10) Patent No.: US 6,863,839 B2
(45) Date of Patent: Mar. 8, 2005

(54) COMPOSITION FOR RESIN-BONDED MAGNET, AND RESIN-BONDED MAGNET USING THE SAME

(75) Inventors: Shoichi Yoshizawa, Chiba (JP); Ryuji Kodama, Chiba (JP); Shin-ichi Hayashi, Chiba (JP)

(73) Assignee: Sumitomo Metal Mining Co., Ltd., Tokyo (JP)

( * ) Notice: Subject to any disclaimer, the term of this patent is extended or adjusted under 35 U.S.C. 154(b) by 0 days.

(21) Appl. No.: 10/193,706

(22) Filed: Jul. 12, 2002

(65) Prior Publication Data

US 2003/0089882 A1 May 15, 2003

(30) Foreign Application Priority Data

Jul. 12, 2001 (JP) ........................................ 2001-211603
Sep. 14, 2001 (JP) ........................................ 2001-279491

(51) Int. Cl.$^7$ ................................................ H01F 1/08
(52) U.S. Cl. .................................. 252/62.54; 252/62.55
(58) Field of Search ........................... 252/62.54, 62.55

(56) References Cited

FOREIGN PATENT DOCUMENTS

| | | | |
|---|---|---|---|
| EP | 0 318 252 | | 5/1989 |
| EP | 1146526 | * | 10/2001 |
| JP | 10-7918 | * | 1/1998 |
| JP | 2000-173809 | * | 6/2000 |
| JP | 2000-232010 | | 8/2000 |
| JP | 2000-331812 | | 11/2000 |
| JP | 2001-11328 | | 1/2001 |
| WO | WO 00/34963 | * | 6/2000 |

* cited by examiner

Primary Examiner—C. Melissa Koslow
(74) Attorney, Agent, or Firm—Westerman, Hattori, Daniels & Adrian, LLP

(57) ABSTRACT

A composition for resin-bonded magnets. The resin-bonded magnets using the composition of the resin have excellent service lives in industry, excellent magnetic characteristics and excellent mechanical strength. A composition for resin-bonded magnets contains a magnetic powder and resin binder. The magnetic powder contains a transition metal element as one of the constituent elements. The binder contains, as the major ingredient, a thermosetting resin containing an organic peroxide and having radical-polymerization reactivity, and is further incorporated with an N-oxyl compound. Also disclosed is a composition including magnetic powder, thermosetting resin having radical-polymerization reactivity and organic oxide as the major ingredients, and a resin-bonded magnet using the same.

15 Claims, No Drawings

COMPOSITION FOR RESIN-BONDED MAGNET, AND RESIN-BONDED MAGNET USING THE SAME

FIELD OF THE INVENTION

This invention relates to a composition for resin-bonded magnets and resin-bonded magnet using the same, more particularly a composition for resin-bonded magnets having excellent service lives in industry, excellent magnetic characteristics and mechanical strength and comprising magnetic powder, thermosetting resin having radical-polymerization reactivity and organic oxide as the major ingredients, and a resin-bonded magnet using the same.

BACKGROUND OF THE INVENTION

The ferrite, Alnico and rare-earth magnets have been used for various purposes, e.g., motors. However, these magnets are mainly produced by the sintering method, and have various disadvantages. For example, they are generally fragile and difficult to be formed into thin or complex-shape products. In addition, they are low in dimensional precision, because of significant shrinkage of 15 to 20% during the sintering step, and need post-treatment, e.g., grinding, to improve their precision.

On the other hand, resin-bonded magnets have been recently developed, in order to solve these disadvantages and, at the same time, to develop new applications. They are generally produced by filling them with a magnetic powder using a thermoplastic resin, e.g., polyamide or polyphenylene sulfide resin, as the binder.

However, the resin-bonded magnet with a thermoplastic resin as the binder involves characteristic disadvantages; its magnetic characteristics, in particular, coercive force and rectangularity, invariably deteriorate, because it is exposed to high temperature of 200° C. or higher while being formed. It has been difficult to produce the resin-bonded magnet with less deterioration of the magnetic characteristics, e.g., coercive force, after it is formed into a shape.

Other types of magnets proposed so far include the one filled with a magnetic powder for which a thermosetting resin, e.g., epoxy or bis-maleimidetriazine resin, serves as the binder. However, it can be formed only into a simple shape by compression molding, because of a limited amount of the binder included.

Under these circumstances, small-size motors, acoustic devices, OA devices or the like have been recently required to be even smaller, which requires the resin-bonded magnets therefor to have even more improved magnetic characteristics and more complex shapes. However, the resin-bonded magnets produced by the conventional method are insufficient in magnetic characteristics and shape complexity for the above purposes. Therefore, it is strongly desired to improve the resin-bonded magnets in the early stage.

Japanese Patent Laid-open Publication No. 10-7918 discloses a composition with an N-oxyl incorporated in a specific resin. However, it cannot produce the effects realizable by the present invention of a mixed composition containing metals including a transition metal, e.g., the effect produced by the mixed composition containing the metal in a high proportion and that by the composition containing an organic peroxide. These effects of the present invention can be sufficiently exhibited in the mixed composition which contains metals including a transition metal having a catalytic function for specific reactions and also an organic peroxide in the presence the metal in a high proportion. For example, the effects similar to those of the present invention cannot be realized by a mixed composition containing metals including a transition metal and binder composition composed of an azo-based polymerization initiator working similarly as a curing agent, the above-described specific resin and N-oxyl compound.

Japanese Patent Laid-Open No. 2001-11328 discloses a composition comprising a thermosetting resin composition composed of a specific resin and metallic compound having a redox function, incorporated with a phenyl sulfonate and N-oxyl compound.

However, it also cannot produce the effects realizable by the present invention of a mixed composition containing metals including a transition metal, e.g., the effect produced by the mixed composition containing the metal at a high proportion and that by the composition containing an organic peroxide. Moreover, the composition of the above patent publication contains an organometallic compound mainly to improve thermosetting characteristics of the composition, unlike the one as the essential component for the present invention. Its content is also very low. Therefore, it is very difficult for the composition to realize the effects of the present invention.

It is an object of the present invention to provide a resin-bonded magnet that is very excellent not only in magnetic characteristics but also excellent in shape freedom, moldability and mechanical strength by controlling oxidation-caused deterioration of the magnetic characteristics, from which the magnet produced by the conventional method suffers while being formed at a high temperature, and making it possible to highly orient an anisotropic magnetic material, for which orientation is very important. These favorable characteristics are produced by solving the problems involved in the resin-bonded magnet produced by each of the conventional methods, i.e., injection molding using a thermoplastic resin and compression molding using a thermosetting resin, the former giving a magnet of complex shape although low in magnetic characteristics, whereas the latter giving only a magnet of simple shape although high in magnetic characteristics. It is another object of the present invention to provide a composition for resin-bonded magnets with excellent service lives, which is most important for the magnet containing a thermosetting resin as the binder.

SUMMARY OF THE INVENTION

The inventors of the present invention have found, after having extensively studied to solve the above problems, that the composition composed of a magnetic powder and resin binder for resin-bonded magnets can have very excellent service lives, which is most important for the magnet containing a thermosetting resin as the binder, when a thermosetting resin containing an organic peroxide and having radical-polymerization reactivity is selected as the major ingredient for the resin binder, and an N-oxyl compound is incorporated in the composition, and that the resin-bonded magnet is very excellent in magnetic characteristics (e.g., coercive force and orientation), shape freedom, moldability and mechanical strength when the above composition is formed into a shape by injection or transfer molding, reaching the present invention.

The first aspect of the invention provides a composition for resin-bonded magnets, composed of a magnetic powder (A) and resin binder (B), the former containing a transition metal element as one of the constituent elements, wherein the binder (B) contains, as the major ingredient, a thermosetting resin (B-1) containing an organic peroxide (B-2) and having radical-polymerization reactivity, and is further incorporated with an N-oxyl compound (C).

The second aspect of the invention provides the composition of the first aspect for resin-bonded magnets, wherein the magnetic powder (A) has an anisotropic magnetic field of 50 kOe or more.

The third aspect of the invention provides the composition of the first or second aspect for resin-bonded magnets, wherein the magnet powder (A) contains the magnetic particles having a size of 100 μm or less at 50% by weight or more, based on the whole magnetic powder.

The fourth aspect of the invention provides the composition of one of the first to third aspects for resin-bonded magnets, wherein the organic peroxide (B-2) has a function of being curable at 150° C. or lower.

"The fifth aspect of the invention provides the composition of one of the first to fourth aspects for resin-bonded magnets, wherein the organic peroxide (B-2) is selected from the group consisting of dialkyl-based compounds and peroxyketal-based compounds."

The sixth aspect of the invention provides the composition of one of the first to fifth aspects for resin-bonded magnets, wherein the thermosetting resin (B-1) having radical-polymerization reactivity is liquid at 150° C. or lower.

The seventh aspect of the invention provides the composition of one of the first to sixth aspects for resin-bonded magnets, wherein the N-oxyl compound (C) has, at the terminal of the molecular chain, at least one of the structure types represented by the following general formula (1):

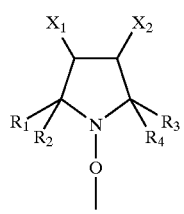

(1)

(wherein, $X_1$ and $X_2$ are each hydrogen atom, or an —$OR_5$, —$OCOR_6$ or —$NR_7R_8$ group; $R_1$, $R_2$, $R_3$ and $R_4$ are each an alkyl group of 1 or more carbon atoms; and $R_5$, $R_6$, $R_7$ and $R_8$ are each hydrogen atom or an alkyl group of 1 to 16 carbon atoms), or by the following general formula (2):

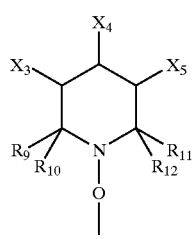

(2)

(wherein, $X_3$, $X_4$ and $X_5$ are each hydrogen atom, or —$OR_{13}$, —$OCOR_{14}$ or —$NR_{15}R_{16}$ group; $R_9$, $R_{10}$, $R_{11}$ and $R_{12}$ are each an alkyl group of 1 or more carbon atoms; and $R_{13}$, $R_{14}$, $R_{15}$ and $R_{16}$ are each hydrogen atom or an alkyl group of 1 to 16 carbon atoms).

The eighth aspect of the invention provides the composition of one of the first to seventh aspects for resin-bonded magnets, wherein the thermosetting resin (B-1) having radical-polymerization reactivity is at least one type of resin selected from the group consisting of vinyl ester, urethane (meth)acrylate, unsaturated polyester and polyester (meth) acrylate resin.

The ninth aspect of the invention provides the composition of one of the first to eighth aspects for resin-bonded magnets, wherein the N-oxyl compound (C) is incorporated at 0.1 to 10 parts by weight per 100 parts by weight of the thermosetting resin (B-1) having radical-polymerization reactivity.

The tenth aspect of the invention provides the composition of one of the first to ninth aspects for resin-bonded magnets, which is serviceable for 120 hours or more at 30° C. under closed, stationary conditions.

The 11$^{th}$ aspect of the invention provides a resin-bonded magnet produced by forming the composition of one of the first to tenth aspects for resin-bonded magnets by at least one method selected from the group consisting of injection molding, extrusion, injection compression, injection pressing and transfer molding.

The present invention relates to a composition for resin-bonded magnets, composed of a magnetic powder (A) and resin binder (B), the former containing a transition metal element as one of the constituent elements, wherein the binder (B) contains, as the major ingredients, a thermosetting resin (B-1) having radical-polymerization reactivity and organic peroxide (B-2), and is further incorporated with an N-oxyl compound (C), and also to a resin-bonded magnet produced by forming the above composition. The preferred embodiments include the following: (1) The composition for resin-bonded magnets, wherein the N-oxyl compound (C) is 2,2,6,6-tetramethyl-4-hydroxypiperidine-1-oxyl or bis(1-oxyl-2,2,6,6-tetramethylpiperidin-4-yl)sebacate.

DETAILED DESCRIPTION
1. Magnet Powder (A)

The magnet powder (A) for the present invention is not limited, so long as it is commonly used for resin-bonded magnets and contains a transition metal element as one of the constituent elements.

The transition metal elements include at least one element selected from the group consisting of iron (Fe), cobalt (Co), nickel (Ni) and manganese (Mn), and may include one of Cr, V and Cu. The particularly preferable transition metal elements are Fe and Co. More specifically, the powders useful for the magnetic powder (A) include rare-earth/cobalt-, rare-earth/iron/boron- and rare-earth/iron/nitrogen-based powders that have an anisotropic magnetic field of 50 kOe or more, either individually or in combination. They also include a mixture of ferrite-based magnetic powder.

The inventors of the present invention have already confirmed that the resin-bonded magnet of particularly excellent magnetic characteristics can be obtained, when one of the following powders is used; (I) Sm—Fe—N-based, fine powder produced by nitriding and finely crushing a coarse Sm—Fe-based alloy powder produced by the reduction/diffusion process, (II) fine alloy powder produced by finely crushing a coarse Sm—Co5-based alloy powder also produced by the reduction/diffusion process, (III) alloy powder produced by treating an Nd—Fe—B-based powder by the liquid quenching process, and (IV) anisotropic Nd—Fe—B-based alloy powder produced by the HDDR (HydrogenationDisproportionationDesorptionRecombination) process.

The Nd—Fe—B-based magnetic powder produced by the liquid quenching process and anisotropic Nd—Fe—B-based powder produced by the HDDR process contain relatively coarse particles of peculiar shape at a high proportion, and preferably crushed by, e.g., jet or ball milling.

The composition of the present invention for resin-bonded magnets can notably exhibit the effects of the present invention, when it contains magnetic particles having a size of 100 μm or less at 50% by weight or more. Moreover, an anisotropic magnetic powder can more notably produce the effects of the present invention than an isotropic one, because the magnetic powder is invariably formed in a magnetic field.

2. Resin Binder (B)

The resin binder (B) for the composition of the present invention for resin-bonded magnets is composed of, as the major ingredients, a thermosetting resin (B-1) having radical-polymerization reactivity and an organic peroxide (B-2).

(1) Thermosetting Resin (B-1) Having Radical-Polymerization Reactivity

The thermosetting resin (B-1) having radical-polymerization reactivity as the essential component for the present invention is not limited, but is preferably at least one type of resin selected from the group consisting of vinyl ester, urethane (meth)acrylate, unsaturated polyester and polyester (meth)acrylate, of which unsaturated polyester and vinyl ester resin are more preferable.

The type of the unsaturated polyester resin is not limited, so long as it is cured in a mold during the molding step to work as the binder for the magnetic powder. A common commercially available unsaturated polyester resin may be used.

One example of the unsaturated polyester resin is composed of an oligomerized or prepolymerized compound as the major component, which is produced by preliminarily polymerizing an unsaturated polybasic acid and/or saturated polybasic acid with glycol to a molecular weight of around 5,000 or less, and incorporated with one or more additives, e.g., monomer also working as the crosslinking agent, curing agent to initiate the reactions and polymerization inhibitor for enabling preservation for extended periods.

The unsaturated polybasic acids useful for the present invention include maleic anhydride, fumaric acid and itaconic acid; and saturated polybasic acids include phthalic anhydride, isophthalic acid, terephthalic acid, tetrahydrophthalic anhydride, methyltetrahydrophthalic anhydride, endomethylenetetrahydrophthalic anhydride, adipic acid, sebacic acid, HET acid and tetrabromophthalic anhydride.

The glycols useful for the present invention include ethylene glycol, propylene glycol, diethylene glycol, dipropylene glycol, neopentyl glycol, 1,3-butanediol, 1,6-hexanediol, hydrogenated bisphenol A, bisphenol A/propylene oxide adduct, dibromoneopentyl glycol, pentaerythrite diallyl ether and allyl glycidyl ether.

Next, the vinyl ester resin useful for the present invention is not limited. For example, it can be produced by causing an epoxy compound to react with an unsaturated monobasic acid in the presence of an esterification catalyst.

The epoxy compound as the stock material for the vinyl ester resin is not limited, so long as it has at least one epoxy group in the molecule. More specifically, these compounds include epibis type glycidyl ether type epoxy resin produced by condensation of a bisphenol compound (e.g., bisphenol A or bisphenol S) with epihalohydrin; novolac type glycidyl ether type epoxy resin produced by condensation of a novolac (condensate of phenol, cresol or bisphenol with formalin) with epihalohydrin; glycidyl ester type epoxy resin produced by condensation of tetrahydrophthalic acid, hexahydrophthalic acid or benzoic acid with epihalohydrin; glycidyl ether type epoxy resin produced by condensation of water-added bisphenol or glycol with epihalohydrin; and amine-containing glycidyl ether type epoxy resin produced by condensation of hydantoin or cyanuric acid with epihalohydrin.

The epoxy compound may have an epoxy group in the molecule by the additional reaction of an epoxy resin with a polybasic acid and/or bisphenol. These epoxy compounds may be used either individually or in combination, as required.

The unsaturated monobasic acid as the stock material for the vinyl ester resin is not limited. More specifically, these compounds include acrylic, methacrylic and crotonic acid. Half esters of maleic and itaconic acid may be used. The above compound may be used in combination with a polyvalent carboxylic acid, e.g., fumaric, itaconic or citraconic acid; saturated monocarboxylic acid, e.g., acetic, propionic, lauric or palmitic acid; saturated polyvalent carboxylic acid, e.g., phthalic acid or anhydride thereof; or saturated or unsaturated alkyd having carboxylic acid at the terminal. These unsaturated monobasic acids may be used either individually or in combination, as required.

The esterification catalysts useful for the present invention specifically include, but not are limited to, tertiary amine, e.g., dimethylbenzyl amine and tributyl amine; quaternary ammonium salt, e.g., trimethylbenzyl ammonium chloride; inorganic salt, e.g., lithium and chromium chloride; imidazole, e.g., 2-ethyl-4-methylimidazole; phosphonium salt, e.g., tetramethylphosphonium chloride, diethylphenylpropylphosphonium chloride, triethylphenylphosphonium chloride, benzyltriethylphenylphosphonium chloride, dibenzylethylmethylphosphonium chloride, benzylmethyldiphenylphosphonium chloride, and tetraphenylphosphonium bromide; secondary amine; tetrabutyl urea; triphenyl phosphine; tritolylphosphine; and triphenylstibine. These esterification catalysts may be used either individually or in combination, as required.

The urethane (meth)acrylate resin useful for the present invention is not limited. For example, it may be produced by causing a polyisocyanate to react with a polyhydroxy compound or polyhydric alcohol, and further causing the effluent to react with a (meth)acrylic compound having a hydroxyl group and, as required, allyl ether compound having a hydroxyl group. Moreover, a (meth)acrylic compound having a hydroxyl group may react with a polyhydroxy compound or polyhydric alcohol, and then with a polyisocyanate.

The specific examples of the polyisocyanate useful as the stock material for the urethane (meth)acrylate resin include, but are not limited to, 2,4-tolylenediisocyanate and an isomer thereof; diphenylmethanediisocyanate, hexamethylenediisocyanate, isophorinediisocyanate, xylylenediisocyanate, hydrogenated xylylenediisocyanate, dicyclohexylmethanediisocyanate, tolidinediisocyanate, naphthalenediisocyanate, triphenylmethaneisocyanate, BURNOCK D 750™ and CRISVON NX™ (Dai-Nippon Ink and Chemicals), DESMODULE L™ (Sumitomo Bayer), CORONATE L™ (Nippon Polyurethane Industry), TAKENATE D102™ (Takeda Chemical Ind.) and ISONATE 143L™ (Mitsubishi Chemical). These polyisocyanates may be used either individually or in combination, as required.

The specific examples of the polyhydric alcohol useful as the stock material for the urethane (meth)acrylate resin include, but are not limited to, ethylene glycol, diethylene glycol, triethylene glycol, polyethylene glycol, propylene glycol, dipropylene glycol, polypropylene glycol, 2-methyl-1,3-propanediol, 1,3-butanediol, adduct of bisphenol A and propylene oxide or ethylene oxide, 1,2,3,4-tetrahydroxybutane, glycerin, trimethylol propane, 1,3-propanediol, 1,2-cyclohexane glycol, 1,3-cyclohexane glycol, 1,4-cyclohexane glycol, para-xylene glycol, bicyclohexyl-4,4'-diol, 2,6-decalin glycol, and 2,7-decalin glycol. These polyhydric alcohols may be used either individually or in combination, as required.

The examples of the polyhydroxy compound useful as the stock material for the urethane (meth)acrylate resin include polyester polyols and polyether polyols. More specifically, they include, but are not limited to, adducts of glycerin and ethylene oxide, glycerin and propylene oxide, glycerin and tetrahydrofuran, glycerin, ethylene oxide and propylene oxide, trimethylol propane and ethylene oxide, trimethylol propane and propylene oxide, trimethylol propane and tetrahydrofuran, trimethylol propane, ethylene oxide and propylene oxide, pentaerythritol and ethylene oxide, pentaerythritol and propylene oxide, pentaerythritol and tetrahydrofuran, pentaerythritol, ethylene oxide and propylene oxide, dipentaerythritol and ethylene oxide, dipentaerythritol and propylene oxide, dipentaerythritol and tetrahydrofuran, dipentaerythritol, ethylene oxide and propylene oxide. These polyhydroxy compounds may be used either individually or in combination, as required.

The (meth)acrylic compound containing hydroxyl group useful as the stock material for the urethane (meth)acrylate resin is not limited, but is preferably a (meth)acrylic ester containing hydroxyl group. More specifically, these compounds include 2-hydroxyethyl (meth)acrylate, 2-hydroxypropyl (meth)acrylate, 3-hydroxybutyl (meth)acrylate, polyethylene glycol mono(meth)acrylate, polypropylene glycol mono(meth)acrylate, di(meth)acrylate of tris(hydroxyethyl)isocyanurate, and pentaerythritol tri(meth)acrylate. These (meth)acrylic compounds containing hydroxyl group may be used either individually or in combination, as required.

The specific examples of the allyl ether compound containing hydroxyl group useful as the stock material for the urethane (meth)acrylate resin include, but are not limited to, ethylene glycol monoallyl ether, diethylene glycol monoallyl ether, triethylene glycol monoallyl ether, polyethylene glycol monoallyl ether, propylene glycol monoallyl ether, dipropylene glycol monoallyl ether, tripropylene glycol monoallyl ether, polypropylene glycol monoallyl ether, 1,2-butylene glycol monoallyl ether, 1,3-butylene glycol monoallyl ether, hexyl glycol monoallyl ether, octyl glycol monoallyl ether, trimethylolpropane diallyl ether, glycerin diallyl ether, and pentaerythritol triallyl ether. These allyl ether compounds containing hydroxyl groups may be used either individually or in combination, as required.

The polyester (meth)acrylate resin is not limited. For example, it may be produced by causing a (meth)acrylic compound to react with an unsaturated or saturated polyester at the terminal. The stock material for the polyester may be the compound similar to that cited before as the stock material for the unsaturated polyester resin.

The specific examples of the (meth)acrylic compound useful as the stock material for the polyester (meth)acrylate resin include, but are not limited to, unsaturated monobasic acids, e.g., unsaturated glycidyl compound and (meth)acrylic acid, and glycidyl esters thereof. These (meth)acrylic compounds may be used either individually or in combination, as required.

The monomers working also as the crosslinking agent include (I) vinyl monomers, e.g., styrene, vinyl toluene, a-methyl styrene, methyl methacrylate and vinyl acetate, (II) allyl monomers, e.g., diallyl phthalate, diallyl isophthalate, triallyl isophthalate, triallyl isocyanurate, diallyl tetrabromophthalate, and (III) acrylate esters, e.g., phenoxyethyl acrylate, 1,6-hexanediol diacrylate, trimethylolpropane triacrylate and 2-hydroxyethyl acrylate.

(2) Organic Peroxide (B-2)

The organic peroxide (B-2) is generally used as the curing agent to initiate the reactions described earlier, and incorporated in the thermosetting resin (B-1) having radical-polymerization reactivity.

The examples of the organic peroxide (B-2) include (I) ketone peroxides, e.g., methylethylketone peroxide, cyclohexanone peroxide, 3,3,5-trimethylcyclohexanone peroxide, methylcyclohexanone peroxide, methylacetoacetate peroxide and acetylacetone peroxide, (II) peroxyketals, e.g., 3,3,5-trimethylcyclohexane, 1,1-bis(t-butylperoxy)cyclohexane, 2,2-bis(t-butylperoxy)octane, n-butyl-4,4-bis(t-butylperoxy)valerate and 2,2-bis(t-butylperoxy)butane, (III) hydroperoxide, e.g., t-butyl hydroperoxide, cumene hydroperoxide, diisopropylbenzene hydroperoxide, menthane hydroperoxide, 2,5-dimethylhexane-2,5-dihydroperoxide and 1,1,3,3-tetramethylbutyl hydroperoxide, (IV) dialkyl peroxides, e.g., di-t-butyl peroxide, t-butylcumyl peroxide, dicumyl peroxide, α,α'-bis(t-butylperoxy-isopropyl)benzene, 2,5-dimethyl-2,5-di(t-butylperoxy)hexane and 2,5-dimethyl-2,5-di(t-butylperoxy)hexyne-3, (V) diacyl peroxides, e.g., acetyl peroxide, isobutyl peroxide, octanonyl peroxide, decanoyl peroxide, lauroyl peroxide, 3,5,5-trimethylhexanoyl peroxide, succinic acid peroxide, benzoyl peroxide, 2,4-dicyclobenzoyl peroxide and toluoyl peroxide, (VI) peroxydicarbonates, e.g., di-isopropyl peroxydicarbonate, di-2-ethylhexylperoxy dicarbonate, di-n-propyl peroxydicarbonate, bis-(4-t-butylcyclohexyl)peroxydicarbonate, di-myristyl peroxydicarbonate, di-2-ethoxyethyl peroxydicarbonate, dimethoxyisopropyl peroxydicarbonate, di(3-methyl-3-methoxybutyl)peroxydicarbonate and diallyl peroxydicarbonate, (VII) peroxy esters, e.g., t-butyl peroxy acetate, t-butyl peroxy isobutyrate, t-butyl peroxy pivalate, t-butyl peroxy neodecanoate, cumyl peroxy neodecanoate, t-butyl peroxy-2-ethylhexanoate, t-butyl peroxy-3,5,5-trimethylhexanoate, t-butyl peroxy laurate, t-butyl peroxy benzoate, di-t-butyl peroxy isophthalate, 2,5-dimethyl-2,5-di(benzoylperoxy)hexane, t-butyl peroxy maleic acid, t-butyl peroxy isopropyl carbonate, cumyl peroxyoctoate, t-hexyl peroxy neodecanoate, t-hexyl peroxy pivalate, t-butyl peroxy neohexanoate, t-hexyl peroxy neohexanoate and cumyl peroxy neohexanoate, and (VIII) acetylcyclohexylsulfonyl peroxide and t-butyl peroxy allycarbonate.

Some of these organic peroxides may be used individually by themselves, and some are used after being diluted with a hydrocarbon solution or phthalate ester, or absorbed in a solid powder.

In any case, the peroxide is preferably decomposed at 150° C. or lower to have a half life of 10 hours, and more preferably at 40 to 135° C. Use of a peroxide decomposed at above 150° C. to have a half life of 10 hours may damage the effect of the present invention, because of increased curing temperature to produce the sufficiently cured formed article. On the other hand, a peroxide decomposed at below 40° C. may itself be difficult to handle and, at the same time, the storage characteristics of the composition of the present invention for resin-bonded magnets may deteriorate, leading to decreased productivity of the composition.

The desired content of the organic peroxide (B-2) cannot be defined sweepingly, because it varies depending on the dilution rate and active oxygen content. However, it is generally incorporated at 0.05 to 10 parts by weight per 100 parts by weight of the thermosetting resin (B-1) having radical-polymerization reactivity.

The organic peroxide (B-2) may be composed of one or more peroxides. It is however very preferable to use a peroxy ketal- or dialkyl-based peroxide individually, in order to produce a longer service life of the final composition for resin-bonded magnets. Service life of the composition for resin-bonded magnets is also referred to as pot life, which means time elapsing until the liquid resin can be no longer formed after it is incorporated with a curing agent or the like, at which its viscosity starts to increase (i.e., time for which it keeps fluidity for forming without undergoing gelation or curing), or time elapsing until mechanical strength of the formed article decreases to 80% of the initial strength, i.e., strength of the article formed immediately after the composition is adjusted, whichever is shorter. The composition generally loses mechanical strength in a shorter time than it loses fluidity, which is one characteristic of the composition of the present invention.

(3) Polymerization Inhibitor

The present invention may be incorporated with a polymerization inhibitor to secure preservation of the composition for extended periods.

The polymerization inhibitors useful for the present invention include quinones, e.g., p-benzoquinone, naphthoquinone, phenanthraquinone, toluquinone, 2,5-diphenyl-pbenzoquinone, 2,5-diacetoxy-p-benzoquinone, 2,5-dicaproxy-p-benzoquinone and 2,5-diacyloxy-p-benzoquinone; hydroqyuinones, e.g., hydroquinone, p-t-butyl catechol, 2,5-di-t-butylhydroquinone, mono-di-t-butylhydroquinone and 2,5-di-t-amylhydroquinone; phenols, e.g., di-t-butyl-paracresolhydroquinone monomethyl ether and α-naphthol; organic or inorganic salts of copper, e.g., copper naphthenate; amidines, e.g., acetoamidine acetate and acetoamidine sulfate; hydrazines, e.g., phenylhydrazine hydrochloride and hydrazine hydrochloride; quaternary ammonium salts, e.g., trimethylbenzyl ammonium chloride, lauryl pyridinium chloride, cetyl trimethyl ammonium chloride, phenyl trimethyl ammonium chloride, trimethylbenzyl ammonium oxalate, di(trimethylbenzyl ammonium) oxalate, trimethylbenzyl ammonium maleate, trimethylbenzyl ammonium tartrate and trimethylbenzyl ammonium glycolate; amines, e.g., phenyl-β-naphthylamine, parabenzylaminophenol, di-β-naphthylparaphenylenediamine; nitro compounds, e.g., nitrobenzene, trinitrotoluene and picric acid; oximes, e.g., quinine dioxime and cyclohexane oxime; polyvalent phenols, e.g., pyrogallol, tannic acid and resorcin; and hydrochlorides of amine, e.g., those of triethylamine, dimethylaniline and dibutylamine. These compounds may be used either individually or in combination.

(4) Other Additives

The binder of the thermosetting resin having radical-polymerization reactivity for the present invention may be incorporated with one or more of various additives, in addition to the above-described components. The additives useful for the present invention include novolac and bisphenol type vinyl ester resins produced from an epoxy resin as the stock material; various reactive resins, e.g., phenolic, urea, melamine, diallyl phthalate, epoxy, silicone, urethane, polyimide, bismaleimide triazine and polyamideimide resin; waxes for improving moldability, e.g., paraffin wax, liquid paraffin, and polyethylene, polypropylene, ester, carnauba and micro wax; fatty acids, e.g., stearic, 1,2-oxystearic, lauric, palmitic and oleic acid; fatty acid salts (metal soaps), e.g., calcium stearate, barium stearate, magnesium stearate, lithium stearate, zinc stearate, aluminum stearate, calcium laurate, zinc linoleate, calcium ricinoleate and zinc 2-ethylhexoate; fatty acid amides, e.g., stearic acid amide, oleic acid amide, erucic acid amide, behenic acid amide, palmitic acid amide, lauric acid amide, hydroxystearic acid amide, methylenebisstearic acid amide, ethylenebisstearic acid amide, ethylenebislauric acid amide, distearyladipic acid amide, ethylenebisoleic acid amide, dioleiladipic acid amide and N-stearyistearic acid amide; fatty acid esters, e.g., butyl stearate; alcohols, e.g., ethylene glycol and stearyl alcohol; polyethers, e.g., polyethylene glycol, polypropylene glycol, polytetramethylene glycol and modified compounds thereof; polysiloxanes, e.g., dimethyl polysiloxane and silicon grease; fluorine compounds, e.g., fluorine-based oil, fluorine-based grease and fluorine-containing resin powder; and powders of inorganic compounds, e.g., silicon nitride, silicon carbide, magnesium oxide, alumina, silicon dioxide and molybdenum disulfide. These compounds may be used either individually or in combination.

Moreover, an inorganic filler or pigment may be optionally incorporated, as required, in addition to the above organic additives. Inorganic fillers useful for the present invention include ferrite-based magnetic powder, e.g., strontium ferrite- and barium ferrite-based ones; soft magnetic powder, e.g., iron; high-gravity metallic powder for adjusting density, e.g., tungsten; flame retardant, e.g., antimony trioxide; and pigment, e.g., titanium oxide.

The thermosetting resin binder having radical-polymerization reactivity for the present invention is not limited by degree of polymerization or molecular weight. However, it is preferable that the composition be free of magnetic powder that has a kinematic viscosity of 100 to 5,000 mPa·s, determined by a rotary viscometer at a forming temperature.

In order to adjust viscosity in the above range, two or more radical-polymerization-reactive thermosetting resins of different viscosity and properties may be mixed with each other, or the composition may be incorporated with an oxide or hydroxide of divalent metal (e.g., beryllium oxide, magnesium oxide or the like), diisocyanate, alizarine compound, aluminum isopropoxide or the like.

Properties of the constituent components of the thermosetting resin binder having radical-polymerization reactivity are not limited, and the binder may be in the form of, e.g., liquid, powder, beads or pellets at normal temperature. However, it is preferably liquid for mixing uniformly with the magnetic powder and moldability. These different resins may be used individually, or two or more types different in molecular weight and properties may be mixed with each other.

Viscosity of the final binder composition, mainly composed of the thermosetting resin binder having radical-polymerization reactivity, is determined in accordance with JIS K-7117 (determination of viscosity of liquid resin by a rotary viscometer), wherein the sample is put in a constant-temperature bath set at the forming temperature (cylinder temperature during the forming step). The kinematic viscosity is preferably in a range of 100 to 5,000 mPa·s, more preferably 300 to 3,000 mPa·s. The composition having a viscosity below 100 mPa·s may not be formed, because possible separation of the magnetic powder and binder from each other during the injection molding step. At above 5,000 mPa·s, on the other hand, the composition may not have the effect of the present invention, because of difficulty in forming resulting from notably increased kneading torque and decreased fluidity.

The final composition of the thermosetting resin binder (B) having radical-polymerization reactivity is incorporated at 5 parts by weight or more but below 50 parts by weight per 100 parts by weight of the magnetic powder (A), preferably 7 to 15 parts, more preferably 10 to 13 parts. At below 3 parts, the effect of the present invention may not be realized, because of notably decreased strength of the formed article and fluidity of the composition during the forming step. At above 50 parts, on the other hand, the desired magnetic characteristics may not be obtained.

3. N-oxyl Compound (C)

The composition of the present invention for resin-bonded magnets is characterized by being incorporated with an N-oxyl compound (C) at the terminal of the molecular chain, as one of the essential components in addition to the above composition and components, to extend its service time while being stored, where the N-oxyl compound (C) has, at the terminal of the molecular chain, at least one structure type represented by the following general formula (1):

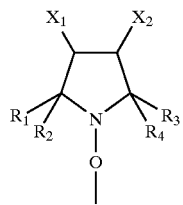

(wherein, $X_1$ and $X_2$ are each hydrogen atom, or an —$OR_5$, —$OCOR_6$ or —$NR_7R_8$ group; $R_1$, $R_2$, $R_3$ and $R_4$ are each an alkyl group of 1 or more carbon atoms; and $R_5$, $R_6$, $R_7$ and $R_8$ are each hydrogen atom or an alkyl group of 1 to 16 carbon atoms), or the general formula (2):

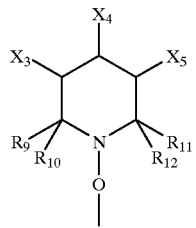

(wherein, $X_3$, $X_4$ and $X_5$ are each hydrogen atom, or an —$OR_{13}$, —$OCOR_{14}$ or —$NR_{15}R_{16}$ group $R_9$, $R_{10}$, $R_{11}$ and $R_{12}$ are each an alkyl group of 1 or more carbon atoms; and $R_{13}$, $R_{14}$, $R_{15}$ and $R_{16}$ are each hydrogen atoms or an alkyl group of 1 to 16 carbon atoms).

It is generally known that decomposition of a peroxide, referred to as the redox reaction, is accelerated at low temperature in a system of transition metal and organic peroxide, to greatly decrease its service life.

The inventors of the present invention have found, after having studied the reaction mechanisms, in particular, the redox reactions, by the experiments and tests, that various reactions, including not only the redox reactions but also the associated complex reactions involving the thermosetting resin having radical-polymerization and styrene among others, are accelerated in the system containing the magnetic powder of the present invention, the phenomena greatly reducing the service life to a level much shorter than that associated with the normal composition of transition metal, free of the magnetic powder.

They have further investigated these reactions to find that the N-oxyl compound exhibits the special function of very efficiently controlling the undesirable reactions for the composition containing the magnetic powder, thereby achieving the present invention.

The N-oxyl compound for the present invention is not limited, so long as it has, at the terminal of the molecular chain, at least one structure type represented by the following general formula (1):

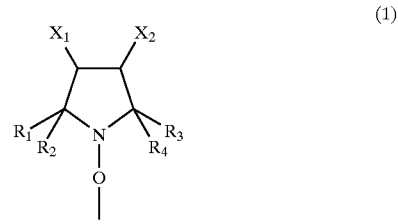

(wherein, $X_1$ and $X_2$ are each hydrogen atom, or an —$OR_5$, —$OCOR_6$ or —$NR_7R_8$ group; $R_1$, $R_2$, $R_3$ and $R_4$ are each an alkyl group of 1 or more carbon atoms; and $R_5$, $R_6$, $R_7$ and $R_8$ are each hydrogen atom or an alkyl group of 1 to 16 carbon atoms), or the general formula (2):

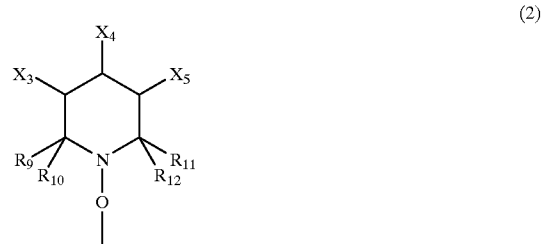

(wherein, $X_3$, $X_4$ and $X_5$ are each hydrogen atom, or an —$OR_{13}$, —$OCOR_{14}$ or —$NR_{15}R_{16}$ group; $R_9$, $R_{10}$, $R_{11}$ and $R_{12}$ are each an alkyl group of 1 or more carbon atoms; and $R_{13}$, $R_{14}$, $R_{15}$ and $R_{16}$ $R_{16}$ are each hydrogen atom or an alkyl group of 1 to 16 carbon atoms). In general, it has the structure represented by the formula (3):

(wherein, $R_{17}$ and $R_{18}$ are each an alkyl group of 4 or more carbon atoms).

The specific examples of the N-oxyl compound having the above structure include, but not limited to, di-t-butylnitroxyl, 1-oxyl-2,2,6,6-tetramethylpiperidine, 1-oxyl-2,2,6,6-tetramethylpiperidin-4-ol, 1-oxyl-2,2,6,6-tetramethylpiperidin-4-yl-acetate, 1-oxyl-2,2,6,6-tetramethylpiperidin-4-yl-2-ethylhexanoate, 1-oxyl-2,2,6,6-tetramethylpiperidin-4-yl-stearate, 1-oxyl-2,2,6,6-tetramethylpiperidin-4-yl-4-t-butylbenzoate, bis(1-oxyl-2,2,6,6-tetramethylpiperidin-4-yl)/succinic acid ester, bis(1-oxyl-2,2,6,6-tetramethylpiperidin-4-yl)/adipic acid ester, bis (1-oxyl-2,2,6,6tetramethylpiperidin-4-yl)sebacate, bis(1-oxyl-2,2,6,6-tetramethylpiperidin-4-yl)/n-butyl malonate ester, bis(1-oxyl-2,2,6,6-tetramethylpiperidin-4-yl) phthalate, bis(1-oxyl-2,2,6,6-tetramethylpiperidin-4-yl) isophthalate, bis(1-oxyl-2,2,6,6-tetramethylpiperidin-4-yl) terephthalate, bis(1-oxyl-2,2,6,6-tetramethylpiperidin-4-yl) hexahydrophthalate, N,N'bis(1-oxyl-2,2,6,6-tetramethylpiperidin-4-yl) adipamide, N-(1-oxyl-2,2,6,6- tetramethylpiperidin-4-yl) caprolactam, N-(1-oxyl-2,2,6,6-tetramethylpiperidin-4-yl) dodecylauccimide, and 2,4,6-tris-N-butyl-N-(1-oxyl-2,2,6,6-tetramethylpiperidin-4-yl)-s-triazine. These N-oxyls may be used either individually or in combination.

The desired content of the N-oxyl compound (C) cannot be defined sweepingly, because it varies depending on its type. However, it is generally incorporated at 0.1 to 10 parts by weight per 100 parts by weight of the thermosetting resin (B-1) having radical-polymerization reactivity, preferably 0.3 to 5 parts. The content out of the above range is undesirable; a sufficient service life may not occur at below 0.1 parts, and the density of the formed article may be insufficient and its surface may be roughened at above 10 parts.

These N-oxyl compounds may be used either individually or in combination. Of these stabilizers, it is preferable to use the one reactive with an alkyl radical and further with a peroxy radical after reacting with the alkyl radical, or reactive with a peroxy radical and further with an alkyl radical after reacting with the peroxy radical in order to secure a longer service life of the composition. It is more preferable to use the stabilizer compound reactive with an alkyl radical and further with a peroxy radical after reacting with the alkyl radical. For example, 2,2,6,6-tetramethyl-4-hydroxypiperidine-1-oxyl represented by the following formula is particularly preferable.

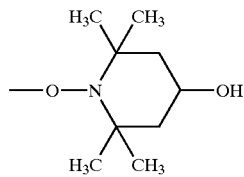

The N-oxyl compound may be used in combination with another compound. Such compounds useful for the composition of the present invention include organic acid salts of cobalt, e.g., cobalt naphthenate and octylic acid; β-diketones, e.g., acetylacetone and ethyl acetoacetate; aromatic tertiary amines, e.g., dimethylaniline; mercaptans; phosphorus compounds, e.g., triphenyl phosphine and 2-ethylhexyl phosphate; promoter, e.g., quaternary ammonium salt; azo compound, e.g., azobisisobutylonitrile; aromatic carbonyl compound; and pinacone derivative.

It is incorporated at 0.01 to 5 parts by weight per 100 parts by weight of the thermosetting resin (B-1) having radical-polymerization reactivity, preferably 0.05 to 3 parts.

4. Composition for Resin-bonded Magnets, and Resin-bonded Magnet

The composition of the present invention for resin-bonded magnets is prepared using the essential components (A) to (C), which may be incorporated with one or more additives, as required.

The method of mixing these components is not limited, and the mixing may be effected by a mixer, e.g., a ribbon blender, a tumbler, a Nauta mixer, a Henschel mixer or a supermixer; or a kneading machine, e.g., a Banbury mixer, a kneader, a roll, a kneader-ruder, or a monoaxial or biaxial extruder.

The composition for resin-bonded magnets thus produced may be in the form of powder, bead, pellet or a combination thereof, of which the pellet (or block) form is preferable for ease of handling.

Next, the composition of the present invention for resin-bonded magnets is heated and becomes molten at a melting point of the thermoplastic resin (B-1) having radical-polymerization reactivity, and then formed into a magnet of desired shape. It may be formed by a known plastic molding methods, e.g., by injection molding, extrusion, injection compression molding, injection pressing, or transfer molding, of which injection molding, extrusion, injection compression molding and injection pressing are preferable.

The method of mixing these components for the present invention is not limited, and the mixing may be effected by a mixer, e.g., a ribbon blender, a tumbler, a Nauta mixer, a Henschel mixer or a supermixer; or a kneading machine, e.g., a Banbury mixer, a kneader, a roll, a kneader-ruder, or a monoaxial or biaxial extruder.

EXAMPLES

The present invention is described in more detail by EXAMPLES and COMPARATIVE EXAMPLES, which by no means limit the present invention.

The compositions for resin-bonded magnets and resin-bonded magnets were prepared by the following procedures using the following materials and components, and were evaluated. The materials and components are described below.

1. Materials and Components (1) Magnetic Powder (A)

Magnetic powder 1: Sm—Fe—N-based magnetic powder (Sumitomo Metal Mining, Sm—Fe—N alloy powder), Anisotropic magnetic field: 210 kOe, Content of the particles having a size of 100 μm or less: 99% by weight Magnetic powder 2: Sm—Co-based magnetic powder (RCo5 alloy™, Sumitomo Metal Mining), Anisotropic magnetic field: 246 kOe, Content of the particles having a size of 100 μm or less: 99% by weight Magnetic powder 3: Nd—Fe—B-based magnetic powder (MQP-B™, Magnequench International), Anisotropic magnetic field: 70 kOe, Content of the particles having a size of 100 μm or less: 62% by weight Magnetic powder 4: Strontium-ferrite-based magnetic powder (MA-951™, Toda Kogyo), Anisotropic magnetic field: 28.5 kOe, Content of the particles having a size of 100 μm or less: 99% by weight Magnetic powder 5: Nd—Fe—B-based magnetic powder (MQP-B™, Magnequench International), Anisotropic magnetic field: 70 kOe, Content of the particles having a size of 100 μm or less: 31% by weight (2) Thermosetting Resin (Thermosetting Resin (B-1) Having Radical-Polymerization Reactivity, and nylon 12 for Comparison)

Unsaturated polyester resin 1 (UP resin 1) (Polyset 2212™, Hitachi Chemical), Viscosity at 25° C.: 500 mPa·s Unsaturated polyester resin 2 (UP resin 2) (Polyset 9164™, Hitachi Chemical), Viscosity at 25° C.: 2,000 mPa·s Vinyl ester resin 1 (VE resin) (Polyset 6120S™, Hitachi Chemical), Viscosity at 25° C.: 500 mPa·s Nylon 12 (Diamide A-1709™, Daicel Huels)

(3) Curing Agent (B-2)

Curing agent 1: Peroxyketal-based peroxide (1,1-di-t-butyloperoxy-3,3,5-trimethylcyclohexane), (Trigonox 29A™, Kayaku Akzo), Decomposition temperature to obtain a half life of 10 hours: 90° C.

Curing agent 2: Dialkyl peroxide-based peroxide [2,5-dimethyl-2,5-di-(t-butyloperoxyhexine-3)], (Kayahexa™, Kayaku Akzo), Decomposition temperature to obtain a half life of 10 hours: 133° C.

Curing agent 3: Azo-based polymerization initiator (2,2'-azobisisobutylonitrile), (ABN-R™, Japan Hydrazine)

(4) N-oxyl Compound (C)

Compound 1: 2,2,6,6-tetramethyl-4-hydroxypiperidine-1-Oxyl, (Adecastub LA-7RD™, Asahi Denka Kogyo)

Compound 2: Bis(1-oxyl-2,2,6,6-tetramethylpiperidin-4-yl)sebacate, (Prostab 5415™, Ciba Specialty Chemicals)

(5) Phenylsulfonic Acid Compound

PPA compound: phenylsulfonic acid (Nissan Chemical Industries)

2. Methods of Production and Evaluation of the Formed Articles

Each formed article was produced and evaluated by the following methods:

(1) Mixing and Preparation of the Composition

A mixture of a given composition of the thermosetting resin, curing agent, N-oxyl compound and other components was mixed with the whole magnetic powder, and well mixed and agitated in a planetary mixer equipped with water-cooling jacket under the conditions of 40 rpm, 30° C. and 10 minutes, to prepare the final composition.

Each of the resultant mixtures was extruded under the same conditions, except for those prepared in COMPARATIVE EXAMPLES 3 and 4, which were extruded by a 20 mm-diameter single extruder (L/D: 25, CR: 2.0, rotational speed: 20 rpm, 5 mm-diameter strand die, cylinder temperature: 200 to 220° C., and die temperature: 100 to 150° C.), and pelletized into the pellet compound for the resin-bonded magnet 5 mm in diameter and 5 mm high by a hot-cut pelletizer.

(2) Injection Molding

Each of the above compounds was formed into a cylindrical test piece of the resin-bonded magnet, 10 mm in diameter and 15 mm high, by an in-line screw or plunger type injection molder equipped with a magnetic field generator under the same conditions (forming temperature: 30 to 180° C., mold temperature: 100 to 220° C.), and the formed article was evaluated by the methods, described later. Only the composition which contained Sm—Co5- or Sm—Fe—N-based magnetic powder was formed in a mold placed in a magnetic field of 15 to 20 kOe.

(3) Evaluation Methods (i) Evaluation of Magnetic Characteristics

Each test piece of the resin-bonded magnet, injection-molded under the above-described conditions, was measured for its magnetic characteristics at normal temperature by a Cioffi type recording fluxmeter. Of the magnetic characteristics, the results of coercive force, magnetization, rectangularity, maximum magnetic product and degree of orientation are given in Tables 2 to 4. Degree of orientation was determined by the SMM method, i.e., {(magnetization of the formed resin-bonded magnet)/(magnetization of VSM composed only of the magnetic powder×volumetric fraction of the magnetic powder in the formed resin-bonded magnet)×100}. The upper limits of these characteristics attainable by the conventional method are given in Table 1. The test piece having each property above the upper limit is judged to be "good."

TABLE 1

|  | Units | Sm—Fe—N-based | Sm—Co-based | Nd—Fe—B-based |
|---|---|---|---|---|
| Coercive force (iHc) | kOe | 7.0 | 4.9 | 10.0 |
| Magnetization (4πIr) | kG | 7.0 | 5.8 | 5.0 |
| Rectangularity (Hk) | kOe | 3.6 | 3.5 | 3.0 |
| Maximum magnetic product (BH)max | MGOe | 9.5 | 8.0 | 5.5 |
| Degree of orientation | % | 90 | 91 | — |

(ii) Mechanical Strength

The test piece separately formed under the above-described forming conditions, 5 mm wide, 2 mm high and 10 mm long, was measured for its shear die-punching strength in accordance with JIS K 7214 (Shear testing method by die-punching a plastic test piece). The results are given in Tables 2 to 4, where the mechanical strength of the as-formed article of each composition is used as the initial level. The test piece having a mechanical strength of 100 MPa or more, which is strongly demanded by the markets, is judged to be "good."

(iii) Service Life

Each composition for resin-bonded magnets, put in a glass bottle and sealed by an aluminum cap, was placed in a constant-temperature bath kept at 30±0.5° C., to determine time elapsing until mechanical strength of the formed article decreased to 80% of the initial strength. The results are given in Tables 2 to 4. The formed articles containing an unsaturated polyester resin, prepared in COMPARATIVE EXAMPLES 1, 2, 5 to 7, showed a phenomenon of rapidly increased viscosity and solidification before it lost the mechanical strength, and could not be formed. For these test pieces, the time elapsing until they were solidified was recorded.

Examples 1 to 16, and Comparative Examples 1 to 7

The composition for resin-bonded magnets and resin-bonded magnet were prepared and evaluated in each of EXAMPLES and COMPARATIVE EXAMPLES by the above-described procedures and methods. Their compositions and evaluation results are given in Tables 2 to 4.

TABLE 2

| Items | Units | EXAMPLE 1 | EXAMPLE 2 | EXAMPLE 3 | EXAMPLE 4 | EXAMPLE 5 | EXAMPLE 6 | EXAMPLE 7 | EXAMPLE 8 | EXAMPLE 9 |
|---|---|---|---|---|---|---|---|---|---|---|
| Compositions | | | | | | | | | | |
| Magnetic powder 1 (Sm—Fe—N-based) | Parts by weight | 100 | 100 | 100 | 100 | 100 | 100 | 100 | 100 | 100 |
| Magnetic powder 2 (Sm—Co-based) | Parts by weight | — | — | — | — | — | — | — | — | — |
| Magnetic powder 3 (Nd—Fe—B-based) | Parts by weight | — | — | — | — | — | — | — | — | — |
| Magnetic powder 4 (Sr-ferrite-based) | Parts by weight | — | — | — | — | — | — | — | — | — |
| Magnetic powder 5 (Nd—Fe—B-based) | Parts by weight | — | — | — | — | — | — | — | — | — |
| Unsaturated polyester resin 1 | Parts by weight | 13.0 | 13.0 | 13.0 | 13.0 | 13.0 | 13.0 | 13.0 | 13.0 | — |
| Unsaturated polyester resin 2 | Parts by weight | — | — | — | — | — | — | — | — | 13.0 |
| Vinyl ester resin 1 (VE resin) | Parts by weight | — | — | — | — | — | — | — | — | — |
| Nylon 12 | Parts by weight | — | — | — | — | — | — | — | — | — |
| Curing agent 1 (Peroxyketal-based peroxide) | Parts by weight | 0.1 | 0.1 | 0.1 | 0.1 | 0.1 | 0.2 | 0.1 | — | 0.1 |
| Curing agent 2 (Dialkyl peroxide-based peroxide) | Parts by weight | — | — | — | — | — | — | 0.05 | 0.1 | — |
| Curing agent 3 (Azo-based polymerization initiator) | Parts by weight | — | — | — | — | — | — | — | — | — |
| N-oxyl compound 1 | Parts by weight | 0.05 | 0.1 | 0.3 | 0.5 | — | 0.1 | 0.1 | 0.1 | 0.1 |
| N-oxyl compound 2 | Parts by weight | — | — | — | — | 0.1 | — | — | — | — |
| PPA compound | Parts by weight | — | — | — | — | — | — | — | — | — |
| Evaluation of composition | | | | | | | | | | |
| Service life | hours | 360 | 600 | 720 | 840 | 480 | 800 | 480 | 432 | 480 |
| Magnet Forming condition | | | | | | | | | | |
| Forming (cylinder) temperature | °C. | 30 | 30 | 30 | 30 | 30 | 30 | 30 | 30 | 30 |
| Mold temperature | °C. | 110 | 110 | 110 | 110 | 110 | 110 | 110 | 110 | 110 |
| Evaluation of Magnet characteristics | | | | | | | | | | |
| Magnetic characteristics — Coercive force (iHc) | KOe | 9.3 | 9.3 | 9.2 | 9.3 | 9.2 | 9.2 | 9.3 | 9.3 | 9.3 |
| Magnetization ($4\pi$Ir) | KG | 7.1 | 7.0 | 6.8 | 6.8 | 7.0 | 7.0 | 7.0 | 6.9 | 6.9 |
| Rectangularity (Hk) | KOe | 4.9 | 4.8 | 4.8 | 4.9 | 4.9 | 4.9 | 4.8 | 4.8 | 4.9 |
| Maximum magnetic product (BH)max | MGOe | 10.7 | 10.5 | 10.5 | 10.3 | 10.6 | 10.6 | 10.7 | 10.5 | 10.5 |
| Degree of orientation | % | 98 | 99 | 98 | 98 | 99 | 99 | 98 | 98 | 98 |
| Mechanical strength | MPa | 118 | 119 | 118 | 120 | 120 | 118 | 124 | 131 | 110 |

TABLE 3

| Items | Units | EXAMPLE 10 | EXAMPLE 11 | EXAMPLE 12 | EXAMPLE 13 | EXAMPLE 14 | EXAMPLE 15 | EXAMPLE 16 |
|---|---|---|---|---|---|---|---|---|
| Compositions | | | | | | | | |
| Magnetic powder 1 (Sm—Fe—N-based) | Parts by weight | 100 | 50 | — | — | — | 100 | 100 |
| Magnetic powder 2 (Sm—Co-based) | Parts by weight | — | — | 100 | — | — | — | — |
| Magnetic powder 3 (Nd—Fe—B-based) | Parts by weight | — | — | — | 100 | 50 | — | — |
| Magnetic powder 4 (Sr-ferrite-based) | Parts by weight | — | 50 | — | — | 50 | — | — |
| Magnetic powder 5 (Nd—Fe—B-based) | Parts by weight | — | — | — | — | — | — | — |

TABLE 3-continued

| Items | Units | EXAMPLE 10 | EXAMPLE 11 | EXAMPLE 12 | EXAMPLE 13 | EXAMPLE 14 | EXAMPLE 15 | EXAMPLE 16 |
|---|---|---|---|---|---|---|---|---|
| Unsaturated polyester resin 1 | Parts by weight | 6.5 | 13.0 | 13.0 | 13.0 | 13.0 | — | 6.5 |
| Unsaturated polyester resin 2 | Parts by weight | 6.5 | — | — | — | — | — | — |
| Vinyl ester resin (VE resin) | Parts by weight | — | — | — | — | — | 13.0 | 6.5 |
| Nylon 12 | Parts by weight | — | — | — | — | — | — | — |
| Curing agent 1 (Peroxyketal-based peroxide) | Parts by weight | 0.1 | 0.1 | 0.1 | 0.1 | 0.1 | 0.1 | 0.1 |
| Curing agent 2 (Dialkyl peroxide-based peroxide) | Parts by weight | — | — | — | — | — | — | — |
| Curing agent 3 (Azo-based polymerization initiator) | Parts by weight | — | — | — | — | — | — | — |
| N-oxyl compound 1 | Parts by weight | 0.1 | 0.1 | 0.1 | 0.1 | 0.1 | 0.1 | 0.1 |
| N-oxyl compound 2 | Parts by weight | — | — | — | — | — | — | — |
| PPA compound | Parts by weight | — | — | — | — | — | — | — |
| Evaluation of composition | | | | | | | | |
| Service life | hours | 648 | 600 | 384 | 720 | 720 | 600 | 600 |
| Magnet Forming condition | | | | | | | | |
| Forming (cylinder) temperature | ° C. | 30 | 30 | 30 | 30 | 30 | 30 | 30 |
| Mold temperature | ° C. | 110 | 110 | 110 | 110 | 110 | 110 | 110 |
| Evaluation of Magnet characteristics | | | | | | | | |
| Magnetic characteristics — Coercive force (iHc) | KOe | 9.2 | 5.8 | 5.2 | 10.0 | 5.3 | 9.0 | 9.3 |
| Magnetization ($4\pi Ir$) | KG | 7 | 4.0 | 6.0 | 5.5 | 3.5 | 7.1 | 7.0 |
| Rectangularity (Hk) | KOe | 4.9 | 3.3 | 3.8 | 3.9 | 2.9 | 4.8 | 4.9 |
| Maximum magnetic product (BH)max | MGOe | 10.4 | 4.2 | 8.1 | 5.9 | 3.4 | 10.1 | 10.7 |
| Degree of orientation | % | 98 | 97 | 98 | — | — | 99 | 99 |
| Mechanical strength | MPa | 112 | 122 | 109 | 120 | 117 | 129 | 122 |

TABLE 4

| Items | Units | COMPARATIVE EXAMPLE 1 | COMPARATIVE EXAMPLE 2 | COMPARATIVE EXAMPLE 3 | COMPARATIVE EXAMPLE 4 | COMPARATIVE EXAMPLE 5 | COMPARATIVE EXAMPLE 6 | COMPARATIVE EXAMPLE 7 |
|---|---|---|---|---|---|---|---|---|
| Compositions | | | | | | | | |
| Magnetic powder 1 (Sm—Fe—N-based) | Parts by weight | 100 | 100 | 100 | — | — | 100 | 100 |
| Magnetic powder 2 (Sm—Co-based) | Parts by weight | — | — | — | — | — | — | — |
| Magnetic powder 3 (Nd—Fe—B-based) | Parts by weight | — | — | — | — | — | — | — |
| Magnetic powder 4 (Sr-ferrite-based) | Parts by weight | — | — | — | — | — | — | — |
| Magnetic powder 5 (Nd—Fe—B-based) | Parts by weight | — | — | — | 100 | 100 | — | — |
| Unsaturated polyester resin 1 | Parts by weight | 5.0 | 13.0 | — | — | 13.0 | 13.0 | 13.0 |
| Unsaturated polyester resin 2 | Parts by weight | — | — | — | — | — | — | — |
| Vinyl ester resin 1 (VE resin) | Parts by weight | — | — | — | — | — | — | — |
| Nylon 12 | Parts by weight | — | — | 13.0 | 13.0 | — | — | — |
| Curing agent 1 (Peroxyketal-based peroxide) | Parts by weight | 0.1 | 0.1 | — | — | 0.1 | — | — |
| Curing agent 2 (Dialkyl peroxide-based peroxide) | Parts by weight | — | — | — | — | — | — | — |

TABLE 4-continued

| Items | | Units | COMPARATIVE EXAMPLE 1 | COMPARATIVE EXAMPLE 2 | COMPARATIVE EXAMPLE 3 | COMPARATIVE EXAMPLE 4 | COMPARATIVE EXAMPLE 5 | COMPARATIVE EXAMPLE 6 | COMPARATIVE EXAMPLE 7 |
|---|---|---|---|---|---|---|---|---|---|
| Curing agent 3 (Azo-based polymerization initiator) | | Parts by weight | — | — | — | — | — | 0.1 | 0.1 |
| N-oxyl compound 1 | | Parts by weight | — | — | — | — | — | 01 | 0.1 |
| N-oxyl compound 2 | | Parts by weight | — | — | — | — | — | — | — |
| PPA compound | | Parts by weight | — | — | — | — | — | — | 0.1 |
| Evaluation of composition | | | | | | | | | |
| Service life | | hours | 24 | 48 | — | — | 72 | 48 | 48 |
| Magnet Forming Condition | | | | | | | | | |
| Forming (cylinder) temperature | | °C. | 30 | 30 | 250 | 250 | 30 | 30 | 30 |
| Mold temperature | | °C. | 110 | 110 | 110 | 110 | 110 | 110 | 110 |
| Evaluation of Magnet characteristics | | | | | | | | | |
| Magnetic characteristics | Coercive force (iHc) | KOe | Not formable | 9.4 | 6.5 | 9.5 | 10.0 | 9.2 | 9.2 |
| | Magnetization (4πIr) | KG | Not formable | 6.9 | 7.0 | 4.3 | 4.5 | 7.0 | 7.0 |
| | Rectangularity (Hk) | KOe | Not formable | 4.7 | 3.5 | 2.8 | 3.9 | 4.9 | 4.7 |
| | Maximum magnetic product (BH)max | MGOe | Not formable | 10.3 | 9.5 | 4.4 | 2.9 | 10.6 | 10.3 |
| | Degree of orientation | % | Not formable | 97 | 90 | — | — | 99 | 99 |
| Mechanical strength | | MPa | Not formable | 118 | 81 | 65 | 91 | 130 | 121 |

As shown in Tables 2 to 4, the composition of the present invention for resin-bonded magnets has excellent service life with respect to both viscosity change and mechanical strength of the formed article, and the resin-bonded magnet of the composition for resin-bonded magnets is excellent in magnetic characteristics and mechanical strength.

As described above, the present invention provides a composition for resin-bonded magnets having very excellent service lives in industry, which is most important when a thermosetting binder is used, by including a magnetic powder, thermosetting resin having radical-polymerization reactivity and N-oxyl compound, and also provides a resin-bonded magnet with excellent magnetic characteristics, shape, freedom, and mechanical strength among others, by forming the above composition by injection molding or the like. As such, the resin-bonded magnet will have very high industrial value, because it can be useful in wide-spread areas, including general home electric appliances, communication/acoustic devices, medical devices and general industrial devices.

What is claimed is:

1. A composition for resin-bonded magnets, comprising a magnetic powder (A) and resin binder (B), the former containing a transition metal element as one of the constituent elements,
    wherein the binder (B) comprises, as the major ingredient, a thermosetting resin (B-1) containing an organic peroxide(B-2) and having radical-polymerization reactivity, and is further incorporated with an N-oxyl compound (C), wherein the N-oxyl compound (C) is incorporated at 0.1 to 10 part by weight per 100 parts by weight of the thermosetting resin (B-1) having radical-polymerization reactivity.
2. The composition for resin-bonded magnets according to claim 1, wherein said magnetic powder (A) has an anisotropic magnetic field of 50 kOe or more.
3. The composition for resin-bonded magnets according to claim 1 or 2, wherein said magnet powder (A) contains the magnetic particles having a size of 100 μm or less at 50% by weight or more, based on the whole magnetic powder.
4. The composition for resin-bonded magnets according to claim 1 or 2, wherein said organic peroxide (B-2) has a function of being curable at 150° C. or lower.
5. The composition for resin-bonded magnets according to claim 1 or 2, wherein said organic peroxide (B-2) is selected from the group consisting of dialkyl-based compounds and peroxyketal-based compounds.
6. The composition for resin-bonded magnets according to claim 1 or 2, wherein said thermosetting resin (B-1) having radical-polymerization reactivity is liquid at 150° C. or lower.
7. The composition for resin-bonded magnets according to one of claim 1 or 2, wherein said N-oxyl compound (C) has, at the terminal of the molecular chain, at least one structure type represented by one of the following general formula (1):

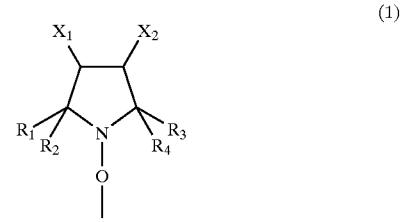

(1)

(wherein, $X_1$ and $X_2$ are each hydrogen atom, or —$OR_5$, —$OCOR_6$ or —$NR_7R_8$ group; $R_1$, $R_2$, $R_3$ and $R_4$ are each an alkyl group of 1 or more carbon atoms; and $R_5$, $R_6$, $R_7$ and $R_8$ are each hydrogen atom or an alkyl group of 1 to 16 carbon atoms), and general formula (2):

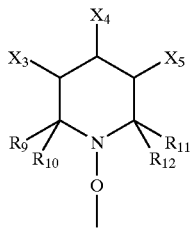

(2)

(wherein, $X_3$, $X_4$ and $X_5$ are each hydrogen atom, or —$OR_{13}$, —$OCOR_{14}$ or —$NR_{15}R_{16}$ group; $R_9$, $R_{10}$, $R_{11}$ and $R_{12}$ are each an alkyl group of 1 or more carbon atoms; and $R_{13}$, $R_{14}$, $R_{15}$ and $R_{16}$ are each hydrogen atom or an alkyl group of 1 to 16 carbon atoms).

8. The composition for resin-bonded magnets according to claim 1 or 2, wherein said thermosetting resin (B-1) having radical-polymerization reactivity is at least one type of resin selected from the group consisting of vinyl ester, urethane (meth)acrylate, unsaturated polyester and polyester (meth)acrylate resin.

9. The composition for resin-bonded magnets according to claim 1 or 2, which is serviceable for 120 hours or more at 30° C. under closed, stationary conditions.

10. A resin-bonded magnet produced by forming the composition according to claim 1 or 2 for resin-bonded magnets by at least one method selected from the group consisting of injection molding, extrusion, injection compression, injection pressing and transfer molding.

11. A composition for use in a resin-bonded magnet, comprising:
 a magnetic powder containing a transition metal; and
 a resin binder, comprising:
  an unsaturated polyester resin;
  an organic peroxide; and
  an N-oxyl compound, wherein the N-oxyl compound is incorporated at 0.1 to 10 parts by weight per 100 parts by weight of the unsaturated polyester resin.

12. The composition for resin-bonded magnets according to claim 11, wherein the composition has a service life of 120 hours or more at a temperature of 30° C. under a closed and stationary condition.

13. A composition for use in a resin-bonded magnet, comprising:
 a magnetic powder containing a transition metal; and
 a resin binder, comprising:
  a thermosetting resin;
  an organic peroxide; and
  an N-oxyl compound,
 wherein the composition has a service life of 120 hours or more at a temperature of 30° C. under a closed and stationary condition.

14. The composition for resin-bonded magnets according to claim 13, wherein said N-oxyl compound (C) is incorporated at 0.1 to 10 parts by weight per 100 parts by weight of the thermosetting resin.

15. The composition for resin-bonded magnets according to claim 13, wherein said thermosetting resin having a radical-polymerization reactivity is at least one type of resin selected from the group consisting of vinyl ester and unsaturated polyester.

* * * * *